United States Patent [19]

Kranitzky

[11] Patent Number: 4,653,108

[45] Date of Patent: Mar. 24, 1987

[54] ELECTRICAL CIRCUIT FOR A MICROPROCESSOR GRAPHIC SYSTEM

[75] Inventor: Walter Kranitzky, Traunstein, Fed. Rep. of Germany

[73] Assignee: Dr. Johannes Heidenhain GmbH, Traunreut, Fed. Rep. of Germany

[21] Appl. No.: 675,126

[22] Filed: Nov. 27, 1984

[30] Foreign Application Priority Data

Dec. 8, 1983 [DE] Fed. Rep. of Germany ....... 3344350

[51] Int. Cl.$^4$ .............................................. G06K 9/46
[52] U.S. Cl. ...................................... 382/25; 364/474; 382/8; 382/23
[58] Field of Search .................. 364/474, 478; 382/60, 382/21, 22, 23, 16, 19, 8, 25

[56] References Cited

U.S. PATENT DOCUMENTS

| | | | |
|---|---|---|---|
| 4,021,778 | 5/1977 | Ueda et al. | 382/25 |
| 4,110,736 | 8/1978 | Kono | 382/25 |
| 4,115,805 | 9/1978 | Morton | 382/23 |
| 4,541,115 | 9/1985 | Werth | 382/23 |

FOREIGN PATENT DOCUMENTS 0089561 9/1983 European Pat. Off. .
0089562 9/1983 European Pat. Off. .

OTHER PUBLICATIONS

Persoon, "A System That Can Learn to Recognize Two-Dimensional Shapes" *Philips Tech. Rev.*, vol. 38, No. 11/12, 1978/79, pp. 356-363.

*Primary Examiner*—Leo H. Boudreau
*Attorney, Agent, or Firm*—Willian Brinks Olds Hofer Gilson & Lione Ltd.

[57] ABSTRACT

An electrical circuit for the graphic processing of resulting contours of several polygonal superposed images stored in memory. Such images, commonly used for numeric machine tool controls, graphically represent a workpiece as sectional contours. The circuit of the present invention, after initialization, determines the inner and outer polygonal contour of the resultant superposed images. The processing speed of the present invention is one to two orders of magnitude greater than the corresponding processing speed of comparable software programs. This high speed processing enables the present invention to represent the effect of a machine tool on a workpiece in three dimensions in real time. By combining this circuit with additional components a relatively inexpensive high speed graphics processor can be created.

7 Claims, 3 Drawing Figures

ELECTRICAL CIRCUIT FOR A MICROPROCESSOR GRAPHIC SYSTEM

BACKGROUND OF THE INVENTION

The present invention relates to an electrical circuit for determining the resultant inner and outer contours of multiple polygonal superposed images stored in a memory unit. Such images are frequently used to represent sections of a workpiece and tool in microprocessor controlled numerical machine stations.

In using these tools, it is frequently advantageous to check the accuracy of the programming with the aid of a graphical representation of the processed workpiece.

Multidimensional representation of workpieces by sectional representation on microprocessor based graphic systems using software display algorithms is common practice. However, this representation is costly in terms of the apparatus and the computational time required. The computational time is especially critical in real time graphic display systems. Simple less expensive microprocessor systems can be used for the graphics display, but the quality of the representation is sacrificed due to the limited computational abilities of these microprocessor systems. Such systems are described in European Pat. Nos. EP-A2-0 089 561 and EP-A2-0 089 562. Also a display device using a read/write memory selectively addressable by an address unit is described in German No. DE-A-28 50 710. To date, commonly used software for generating workpiece images on microprocessor based graphic systems is not totally satisfactory for real time representation.

SUMMARY OF THE INVENTION

The present invention is directed to an electrical circuit for use in the graphics component of numeric machine tool controls, which operates simply and rapidly to generate real time graphic representations.

According to this invention, an electrical circuit is provided for determining the inner and outer contours of several polygonal superposed stored images. This circuit includes a memory unit which comprises a plurality of individually addressable memory cells sufficient to store the superposed images. This memory unit further comprises address inputs for selecting the memory cell to be accessed and an output for communicating the contents of the cell addressed. An address logic is provided in electrical communication with said memory unit address inputs, and a temporary storage element is provided in electrical communication with said memory unit output. A flow control unit is electrically connected with the address logic unit the temporary storage element and operates to sequence said address logic unit and said temporary storage element. The memory unit, the address logic unit, the temporary storage unit and the flow control unit all cooperate to access a cell of the memory unit with an address which is dependent upon the contents of the previously addressed cell of the memory unit. The dependent claims set forth further advantageous features of this invention.

An advantage of the present invention is that it allows an unsophisticated computer control graphics system to graphically display structures in an efficient manner because the invention uses a hardware implemented algorithm rather than a software program. The circuit of the present invention reduces the time required for the graphic representation by one or two orders of magnitude in comparison with software oriented display systems.

Another particular advantage of the preferred embodiment described below is the ability of the circuit to be integrated with other components to construct a graphics display controller for displaying images. When used in conjunction with numeric machine tools, the high speed graphics processing capability of the present invention allows the display of a real time representation of the effect of the tool on a work piece in three dimensions. These images provide the machine operator with a valuable aid.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
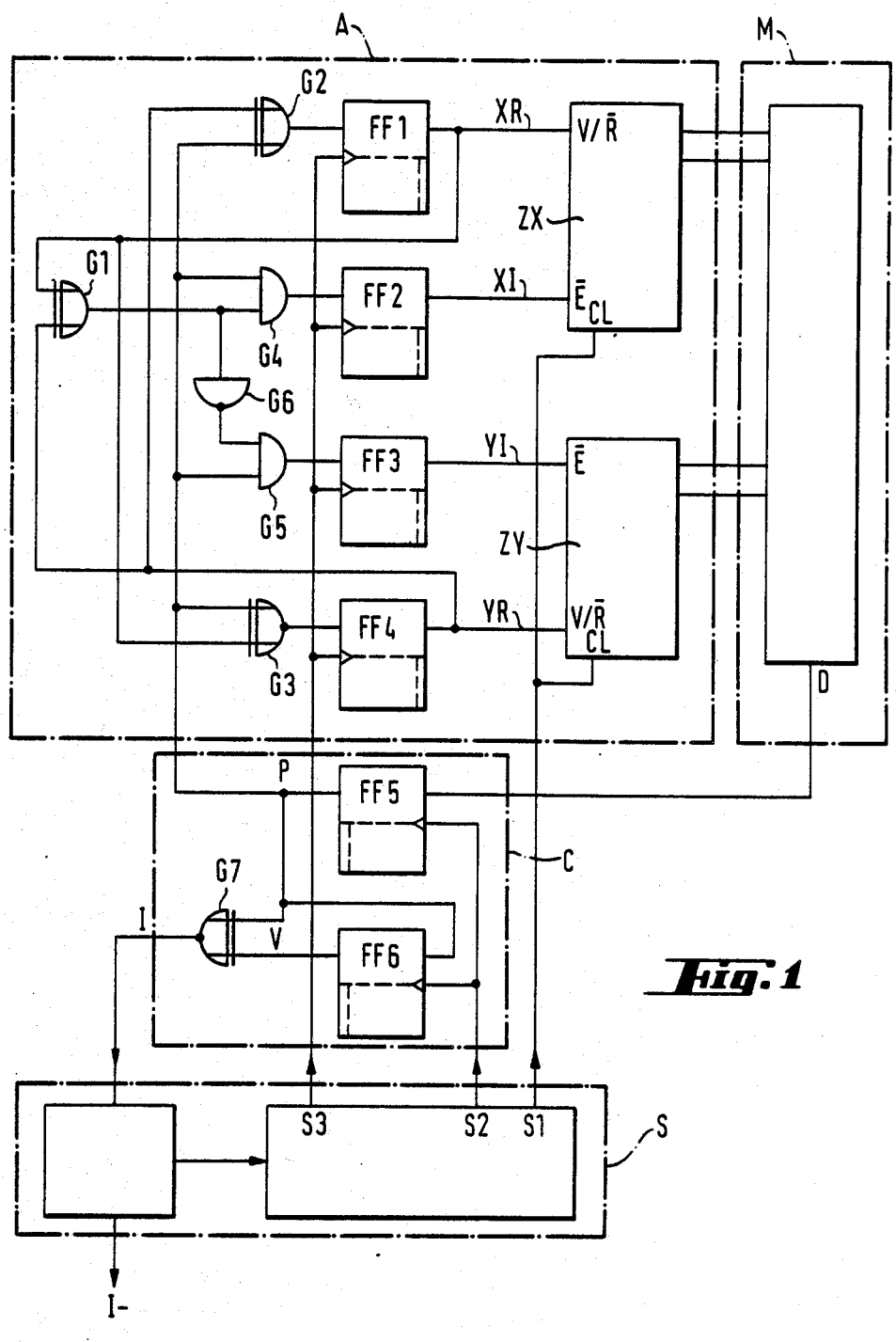
FIG. 1 is a schematic representation of a preferred embodiment of the graphic control circuit of this invention.

The electrical circuit shown in FIG. 1 employs a memory unit M into which the superposed images are stored. The memory unit M contains a plurality of memory cells, and each cell is individually addressable and contains an image point datum, called a pixel.

The address logic unit A is capable of addressing each individual image point and contains two up-down counters ZX and ZY, which are controlled by four bistable flip-flop circuits FF1–FF4. The input signals to the flip-flop circuits FF1–FF4 are generated by a logic network G1–G6 which in turn receives input data from the image point memory unit M, thereby creating a recursive network. To determine the contour of several overlapping images, the initial coordinates are deposited into the address counters ZX and ZY. In the example shown in FIG. 2, these coordinates are X=3, Y=3. The counting direction to the next image point to be searched is determined from the path of the contours and deposited into the flip-flops FF1–FF4. For example, the next image point to be tested in FIG. 2 has coordinates X=2, Y=3.

In order for the address logic unit A to control the counters ZX and ZY to follow a line in the desired X- or Y-direction, the following logical conditions control:

$$XR_{n+1} = YR_n \oplus P_n \quad (1)$$

$$YR_{n+1} = \overline{XR_n \oplus P_n} \quad (2)$$

$$XI_{n+1} = (XR_n \oplus YR_n) \cdot P_n \quad (3)$$

$$YI_{n+1} = (\overline{XR_n \oplus YR_n}) \cdot P_n \quad (4)$$

The signals XR and YR control the counting direction of the respective counters ZX and ZY (1=forward, 0=backward). XI and YI represent the counter enabling signals (1=counter inhibited, 0=counter enabled). $P_n$ is the content of the memory cell containing the image point stored at the address represented by the control signals $XR_n$, $YR_n$, $XI_n$, and $YI_n$. Of the sixteen possible combinations of these variables only eight are permitted. The eight signals determine the addressing of the image point as left, right, up, down, up left diagonal, down left diagonal, up right diagonal, and down right diagonal. These directions are controlled by the equations (1)–(4) above.

In initializing these variables it should be understood that an allowed combination must be chosen. The following equations establish the allowed combinations:

$$XR = YR \text{ for } XI = 1 \qquad (5)$$

$$YR = \overline{XR} \text{ for } YI = 1 \qquad (6)$$

Because equations (1)–(4) above are recursive, the four flip-flops FF1–FF4 are used as temporary storage for the feedback linkage network G1–G6. The output signals $\overline{XR}$ and $\overline{YR}$ are connected to the Up-Down inputs V/R of the two address counters ZX and ZY, respectively. And, the inhibiting signals XI and YI are connected to the Count Enable inputs $\overline{E}$ of the counters ZX and ZY, respectively. These four variables therefore establish whether and in what direction the counters ZX and ZY count the subsequent clock impulse that is supplied over the line S1 by the flow control S. FF5 is used to temporarily store the state of the image element (pixel on or pixel off) just addressed, and the output of FF5 delivers the signal P.

The clock inputs CL of the counters ZX and ZY, and the flip flops FF1–FF5 are controlled by the signals S1–S3 of the flow control S. These signals are required because of the set up times and access times of the individual components. Flip-flop FF6 and logic gate G7 generate an interrupt signal I when two consecutive image points, $P_n$ and $P_{n+1}$ are equal. This occurs when a corner point is reached.

Figure 2:
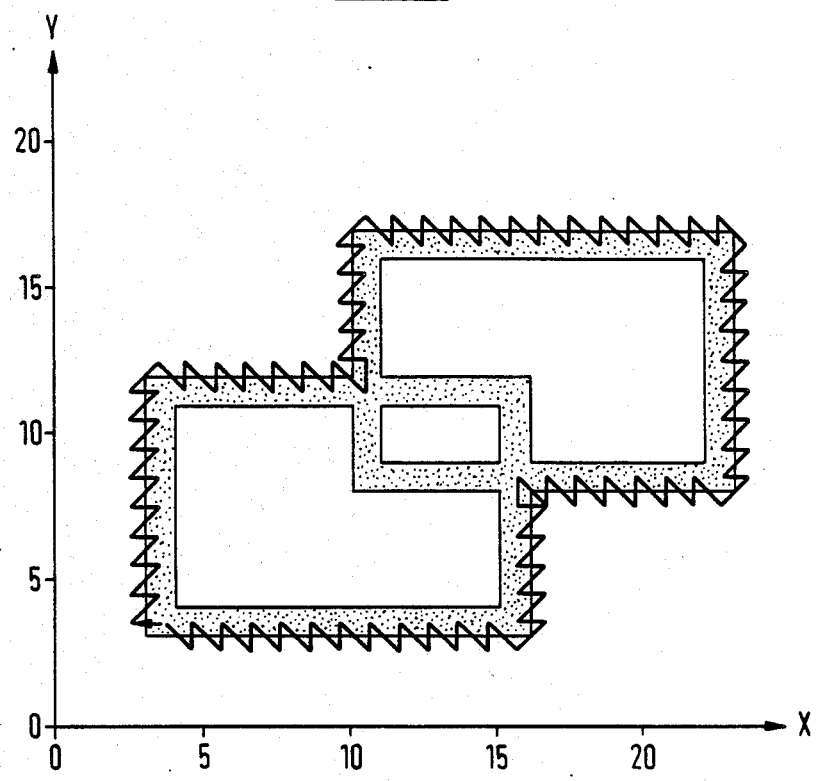
FIG. 2 is a schematic diagram showing the manner in which the outer contour of two section planes, offset obliquely with respect to one another, is determined by the circuit of FIG. 1.
Figure 3:
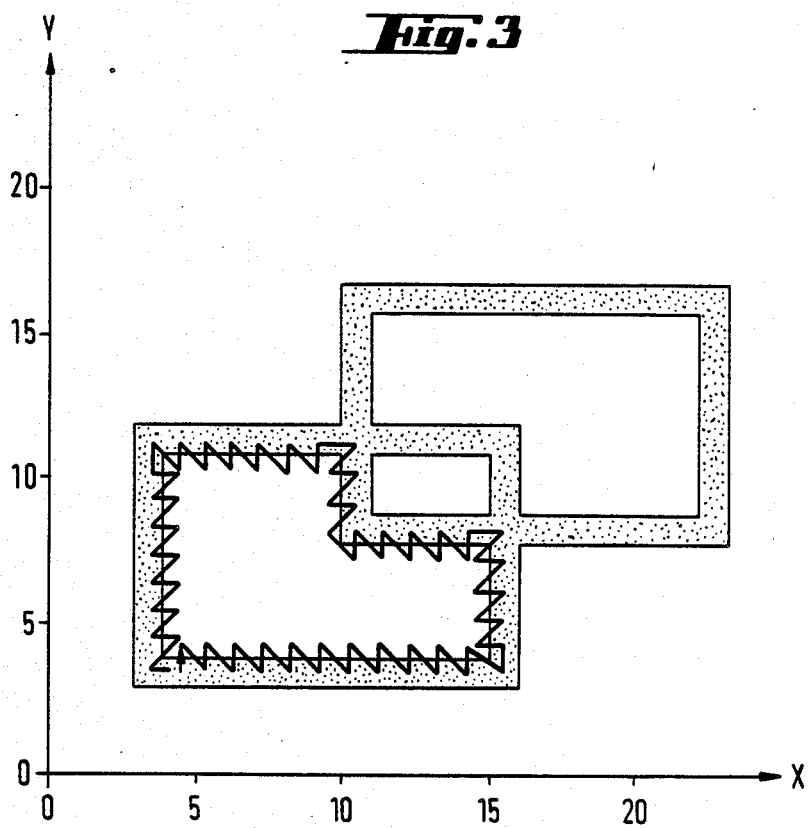
FIG. 3 is a schematic diagram showing the manner in which the inner contour of two section planes, offset obliquely with respect to one another, is determined by the circuit of FIG. 1.

As noted in FIGS. 2 and 3 it is evident that the signal P stored in FF5 for the image point memory cell, always contains alternate values of 0, 1, 0, 1 etc., when processing a straight line. A right corner is determined by the detection of an activated pixel to the right of the straight line. A left corner is determined by the detection of an activated pixel to the left of the straight line. Hence upon reaching a right corner the value 0 would be stored twice in succession in FF5. Similarly, on reaching a left corner the value 1 would be stored twice in succession in FF5. Flip-flop circuit FF6 delays the signal P by one cycle of S2 and the resultant signal V, when exclusively OR'd with the original signal P and negated, forms the signal I. Therefore, when a corner point is determined, I is activated and may be used to signal a microprocessor to read the contents of counters ZX, ZY.

The following table illustrates the operation of the linkage rules of equations (1)–(4):

|       | XR | XI | YR | YI | P |
|-------|----|----|----|----|----|
| n     | 0  | 0  | 1  | 1  | 0 |
| n + 1 | 1  | 0  | 1  | 0  | 1 |
| n + 2 | 0  | 0  | 1  | 1  | 0 |
| n + 3 | 1  | 0  | 1  | 0  | 1 |
| n. .. | 0  | 0  | 1  | 1  | 0 |
| n. .. | 1  | 0  | 1  | 0  | 0 |

⎫ Right Corner

| | XR | XI | YR | YI | P |
|---|---|---|---|---|---|
| n. .. | 1 | 0 | 0 | 0 | 1 |
| n. .. | 1 | 1 | 1 | 0 | 0 |
| n. .. | 1 | 0 | 0 | 0 | 1 |
| n. .. | 1 | 1 | 1 | 0 | 0 |
| n. .. | 1 | 0 | 0 | 0 | 1 |
| n. .. | 1 | 1 | 1 | 0 | 1 |
| n + i | 0 | 0 | 1 | 1 | 0 |

⎫ Left Corner

The flow control S generates the periodic timing signals S1, S2 and S3. S1 carries a counting impulse to activate counters ZX and ZY. S2 activates flip-flops FF5 and FF6 and is delayed from S1 a sufficient time for the addressed memory cells to be accessed. And S3 is used to latch flip-flops FF1–FF4.

When a corner has been found, I=1 and the flow control S is stopped. Not that the address counters after recognizing a corner point do not exactly reproduce the corner coordinates. In the example, the counters indicate a corner coordinate of X=3, Y=12; however, the corner is actually located at X=3, Y=11. This deviation of one bit can be corrected with an adding circuit in the read-out of the coordinates. It is also possible to correct the corner coordinates by interposing several gates in the control lines XR, YR, XI, and YI to alter the counter state in an intermediate cycle of the flow control S. The coordinates can then be read out and the old counter state restored. Once the flow control S has been halted at I=1 and the addresses XR and YR have been read, the flow control S can again be started and the process continued.

In order to detect a completed revolution, the locations of the first corner coordinates detected, $X_o$ and $Y_o$, can be stored and then compared through exclusive OR gates with the counter state. If the contents of counters XR and YR equal the contents of the stored values $X_o$ and $Y_o$, respectively, all corner coordinates of the polygonal contour have been detected and transferred to the microprocessor.

The determination of the inner contour as shown in FIG. 3 is analogous to the above described procedure for determining the outer contour once the initial coordinates and counting directions are initialized into counters ZX and ZY and into flip-flops FF1–FF4.

The circuit of the present invention can readily be combined with a vector generator, a refresh control for dynamic memory, and interrupt logic to create a three dimensional graphic controller. The hardware approach to graphic processing taken by the present invention can result in an increase in processing speed of one to two orders of magnitude over a comparable software algorithm. This increase in processing speed enables even simple microprocessor based graphic display systems to display complex representations in real time.

The foregoing detailed description has been given for illustrative purposes only. A wide range of changes and modifications can be made to the preferred embodiment described above. It should be understood that it is the following claims, including all equivalents, which are intended to define the scope of this invention.

I claim:

1. An electrical circuit for determining the inner and outer contours of several polygonal superposed stored images comprising:

a memory unit comprising a plurality of individually addressable memory cells sufficient to store said superposed images; said memory unit further comprising address inputs for selecting the memory cell to be accessed and an output for communicating the contents of the cell addressed;

an address logic unit in electrical communication with said memory unit address inputs;

a temporary storage element in electrical communication with said memory unit output; and a flow control unit in electrical communication with said address logic unit and said temporary storage element; said flow control unit operative to sequence said address logic unit and said temporary storage element; said memory unit, said address logic unit, said temporary storage element and said flow control unit cooperating to access a cell of said memory unit with an address which is dependent upon the contents of the previously addressed cell of said memory unit.

2. The invention of claim 1 wherein said address logic unit comprises:

at least two up-down counters corresponding to two coordinate directions and in electrical communication with said memory unit address inputs;

a plurality of bistable flip-flop circuits in electrical communication with said up-down counters; and a plurality of logic components in electrical communication with said flip-flop circuits and in electrical communication with said temporary storage element; said flip-flop circuits and said logic components operative to enable the counting of said up-down counters and to determine the direction of counting of said up-down counters.

3. An electrical circuit for determining the inner and outer contours of several polygonal superposed stored images having a plurality of vertices, the circuit comprising:

a memory unit comprising a plurality of individually addressable memory cells sufficient to store said superposed images; said memory unit further comprising address inputs for selecting the memory cell to be accessed and an output for communicating the contents of the cell addressed;

an address logic unit in electrical communication with said memory unit; said address logic unit operative to address two consecutively equal memory cells upon locating a vertex of said superposed images;

an interrupt logic unit capable of detecting two consecutively equal occurrences of said memory unit output; and a control logic unit in electrical communication with said address logic unit and said interrupt logic unit; said control logic unit operative to sequence said address logic unit and said interrupt logic unit.

4. The invention of claim 3 wherein said address logic unit comprises:

at least two up-down counters corresponding to two coordinate directions and in electrical communication with said memory unit address inputs;

a plurality of bistable flip-flop circuits in electrical communication with said up-down counters; said flip-flop circuits cooperating with said up-down counters to control the counting of said up-down counters; and a plurality of logic components in electrical communication with said memory unit and said flip-flop circuits to recursively determine the state of said flip-flop circuits based upon the contents of the previously addressed memory cell of said memory unit.

5. The invention of claim 3 wherein said interrupt logic unit comprises:

a first flip-flop circuit comprising an input and an output; said first flip-flop input electrically connected with said memory unit output;

a second flip-flop circuit comprising an input and an output; said second flip-flop input electrically connected with said first flip-flop circuit output; and at least one logic element comprising two inputs; one input of said logic element electrically connected with said first flip-flop output and the other input of said logic element electrically connected with said second flip-flop output; said logic element operative to indicate the equality of said first flip-flop output and said second flip-flop output.

6. The invention of claim 5 wherein said logic element comprises a negating exclusive OR gate.

7. An electrical circuit for determining the inner and outer contours of several polygonal superposed stored images, the circuit comprising;

a memory unit comprising a plurality of individually addressable memory cells sufficient to store said superposed images; said memory unit further comprising address inputs for selecting the memory cell to be accessed and an output for communicating the contents of the cell addressed;

an address logic unit in electrical communication with said memory unit address inputs; said address logic unit comprising first and second up-down counters for temporarily storing the address of a memory cell of said memory unit; said first and second up-down counters comprising inputs for enabling said counters and inputs for controlling the counting direction of said counters; said address logic unit further comprising electrical components operative to control said first and second up-down counters according to the relations:

$$XR_{n+1} = YR_n \oplus P_n$$

$$YR_{n+1} = \overline{XR_n \oplus P_n}$$

$$XI_{n+1} = (XR_n \oplus YR_n) \cdot P_n$$

$$YI_{n+1} = \overline{(XR_n \oplus YR_n)} \cdot P_n$$

where:

XR and YR represent the counting direction of said first and second up-down counters respectively; XI and YI represent enabling inputs to said first and second up-down counters, respectively; and P represents the value of the addressed cell of said memory unit;

said address logic unit operative to address two consecutively equal memory locations on encountering a vertex of said superposed images;

an interrupt logic unit capable of detecting two consecutively equal occurrences of said memory unit output; and a control logic unit in electrical communication with said address logic unit and said interrupt logic unit; said control logic unit operative to sequence said address and said interrupt logic units.

* * * * *